United States Patent
Celizic et al.

(10) Patent No.: US 6,683,461 B2
(45) Date of Patent: Jan. 27, 2004

(54) SERVO CONTROLLED CALIBRATION OF REPEATABLE ERRORS IN POSITION TRANSDUCERS

(75) Inventors: Frank J. Celizic, Fort Wayne, IN (US); Robert H. Josselson, Fort Wayne, IN (US)

(73) Assignee: ITT Manufacturing Enterprises Inc., Wilmington, DE (US)

( * ) Notice: Subject to any disclaimer, the term of this patent is extended or adjusted under 35 U.S.C. 154(b) by 14 days.

(21) Appl. No.: 10/095,015

(22) Filed: Mar. 12, 2002

(65) Prior Publication Data

US 2003/0173974 A1 Sep. 18, 2003

(51) Int. Cl.[7] .............................................. G01R 35/00
(52) U.S. Cl. ...................................................... 324/601
(58) Field of Search ................................. 324/601, 660, 324/686, 662, 671; 700/254, 193; 702/145, 147, 94; 318/561

(56) References Cited

U.S. PATENT DOCUMENTS

| | | | |
|---|---|---|---|
| 4,338,659 A | 7/1982 | Kurakake | 700/193 |
| 4,446,715 A | 5/1984 | Bailey | 73/1.88 |
| 4,456,863 A | 6/1984 | Matusek | 318/572 |
| 4,852,018 A | 7/1989 | Grossberg et al. | 700/259 |
| 5,021,941 A | 6/1991 | Ford et al. | 700/71 |
| 5,483,058 A | 1/1996 | Leviton | 250/231.13 |
| 5,501,512 A | 3/1996 | Hart | 303/15 |
| 5,949,605 A | 9/1999 | Lee et al. | 360/77.04 |
| 5,965,879 A | 10/1999 | Leviton | 250/231.13 |
| 5,997,778 A | 12/1999 | Bulgrin | 264/40.1 |

*Primary Examiner*—Albert Decady
*Assistant Examiner*—James Kerveros
(74) *Attorney, Agent, or Firm*—Davidson Berquist Klima & Jackson LLP

(57) ABSTRACT

A servo control calibration apparatus and method for correcting repeatable errors in position transducers is described. Unlike prior static direct measurement techniques or prior repetitive control techniques that correct error signals only within a low bandwidth, the present servo control calibration apparatus and method is done in-situ with the position transducer using a dynamic, closed loop servo operation. The present servo control calibration apparatus and method combine an in-situ error measurement and calibration device with a normal operation servo control closed-loop mechanism. In the calibration mode, the present servo control calibration apparatus and method measure the repeatable errors in a position transducer. Correction characteristics are stored and used in the normal operation of the servo control calibration apparatus and method to eliminate error from the control of the associated servo.

20 Claims, 4 Drawing Sheets

SERVO CONTROLLED CALIBRATION OF REPEATABLE ERRORS IN POSITION TRANSDUCERS

FIELD OF THE INVENTION

This invention relates to apparatus and method for calibrating transducers.

BACKGROUND AND SUMMARY OF THE INVENTION

Transducers are used in a variety of applications to measure such things as position, pressure, or other physical or environmental characteristics. Position transducers, for example, detect positional movement in a variety of applications. One example position transducer is disclosed in U.S. Pat. No. 5,965,879 (the '879 patent) and provides high sensitivity optical encoding. Such encoders have application in ultra-high precision, two-axis scanning mirror mechanisms. Of course, high resolution position transducers are extremely difficult to calibrate primarily because the test equipment must perform with greater precision than the transducer being tested.

Still, repeatable errors are induced within servo controlled systems that employ position feedback from inductor resolvers or optical encoders used in positional measurement. These errors are often removed or minimized using a calibration process involving the direct measurement of the position error at pre-determined locations within the motion range of the device. The error is measured statically, with the servo holding the mechanism at a fixed position for the duration of the measurement. As a result, error measurement requires very precise alignment of the measuring system to the mechanism and, in most cases, cannot be performed in-situ.

As described above, the direct measurement technique of prior calibration systems was a static operation. It required external devices to measure the error, which external devices had to have a higher accuracy than the system under calibration. For standard optical encoder systems, for example, devices such as theodolites were commonly used to provide high accuracy for calibration. Ultimately, devices which were costly, bulky, and complex were required to make direct measurement on the target system, which test devices were not only expensive but also difficult to perform in-situ.

In addition, the direct measurement technique was time consuming. Many measurements had to be made over the range of travel when errors had high spatial frequencies, as was the case with high resolution encoders. If the number of direct measurements was small to keep the test time low, interpolation of the data was required, which induced calibration error. Further, independent measurement devices required alignment by error-prone human operators.

In other prior calibration processes, repetitive measurement and control of repeatable errors in servo control systems have been employed to remove low frequency, disturbance induced errors. The repetitive system of calibration uses multiple measurements of the error to slowly correct the error.

The repetitive control technique had limited capability to correct error in measurements because the control bandwidth was very low. In such a system, sampling had to be kept at a low frequency in order to stay within appropriate Nyquist control characteristics (i.e., to remain stable). As a result, the repetitive calibration system did not accurately correct error signals outside of a low bandwidth. Further, an accurate measurement using servo error was not always possible because the amplitude and phase of the signal source appeared attenuated, amplified, or phase-shifted, depending upon frequency.

As one example, testing of the encoders in the HIRDLS system revealed a 0.6 arc seconds peak-to-peak cyclical error. To characterize and discover the source of the error, NASA brought in a new technology encoder to provide independent, high accuracy data. The test set up with both the operational encoder and the calibration encoder was used exhaustively over several months to characterize the nature of the cyclical error in the HIRDLS encoder. In contrast, an example embodiment of the present invention can perform the same test in a matter of hours without the need for the special calibration encoder. Thus, using the present invention, substantial savings can be realized in that a highly precise calibration encoder is not required in order to resolve repeatable errors. The calibration of a position transducer can be performed quickly, inexpensively, and in-situ.

The present invention provides calibration of repeatable errors in position transducers in a much preferable manner compared to either the direct measurement technique or the repetitive control technique of prior devices. In accordance with the present invention, direct measurements of error are taken in closed loop servo conditions. Unlike the direct measurement technique, no additional high precision calibration system is required, and tests can be performed quickly, inexpensively, and in-situ. Also, unlike the repetitive control technique, the present invention is not limited to calibration at only low control bandwidths.

In accordance with an example and preferred embodiment of the present invention, calibration of repeatable errors in position transducers is performed dynamically, in-situ under closed loop servo operation. The closed loop servo operation eliminates the man in the loop and allows for automatic, rapid, real-time measurement of the repeatable error.

DETAILED DESCRIPTION OF A PRESENTLY PREFERRED EMBODIMENT

Figure 1:
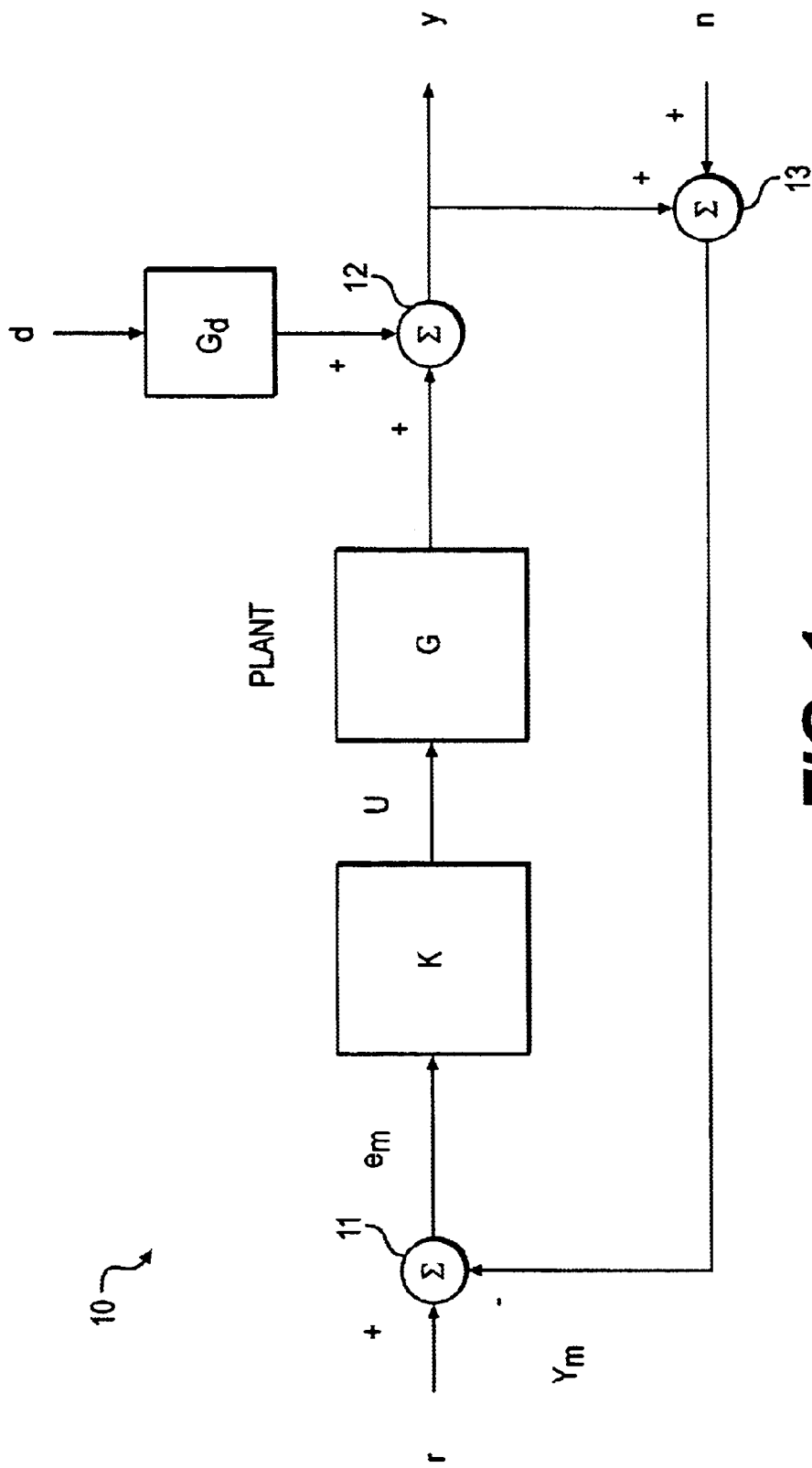
FIG. 1 is a closed loop servo configuration in accordance with an example embodiment of the present invention.

A relevant closed loop servo configuration is shown in FIG. 1. In the loop, a measured plant output $y_m$ is subtracted from a reference signal r at the summing device 11 of the loop 10. The output of the summing device 11 is the measured or servo error $e_m$, which is input into controller K yielding the plant input control signal u. The plant input control signal u is input to plant G, the output of which is provided to the summing device 12. Disturbance transfer function $G_d$ operates on a disturbance signal d to provide the other input to the summing device 12. When the outputs of the plant G and the disturbance transfer function $G_d$ are summed at the summing device 12, the output is the plant output y. The plant output y is summed at summing device 13 with a position transducer measurement error signal n to create the measured plant output $y_m$ that is fed back into the summing device 11.

Using the embodiment of FIG. 1, the measured, or servo, error $e_m$ is calculated as follows:

$$e_m = r - y_m = r - y - n \quad \text{(Eq. 1)}$$
$$= r - n - G_d d - GKe_m$$
$$= (1 + GK)^{-1}(r - n - G_d d)$$
$$= S(r - n - G_d d)$$

Where $$S = (1 + GK)^{-1}$$

is the sensitivity function.

By selecting a reference r such that
|Sr|<<|Sn| and |SG_d d|<<|Sn|, Eq.1 becomes $$e_m \approx S(-n)$$

where |Sr| is the servo error $e_m$ due to the command r, |SG_d d| is the servo error $e_m$ due to the disturbance d, and |Sn| is the servo error $e_m$ due to the position transducer repeatable error n.

Figure 2:
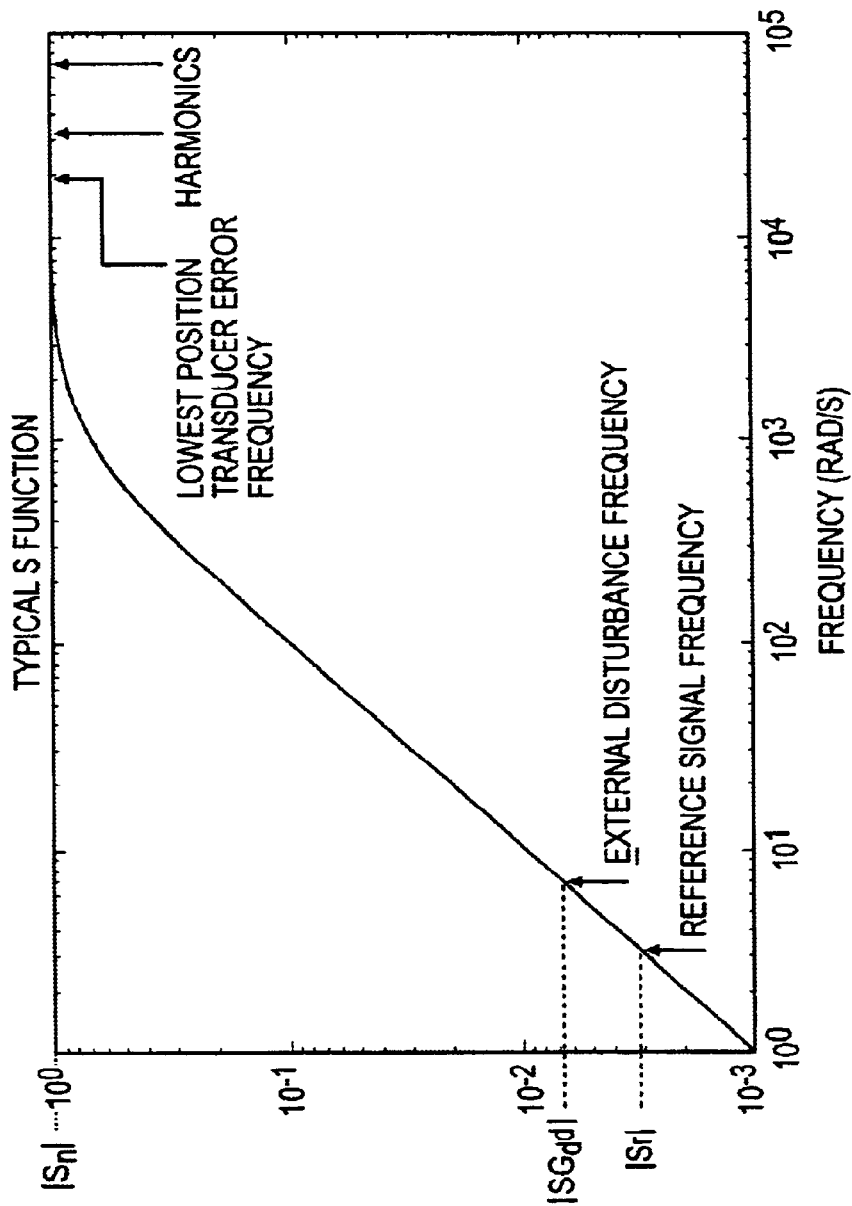
FIG. 2 is a typical sensitivity function showing frequency content separation within an example embodiment of FIG. 1.

Thus, with the presumptions described, $e_m$ becomes a measure of the position transducer fine track error. Further, $e_m$ becomes a direct measure of the error if S=1. FIG. 2 shows a typical sensitivity function with the desired frequency separation.

The preferred embodiment of the present invention draws from several conclusions made by analysis of FIGS. 1 and 2. In particular, it is preferable to use a controller with a low enough bandwidth so that the S function gain is about 1 and its phase is about 180° at the lowest frequency of the position transducer measurement error. Secondly, it is preferable to select a constant rate position command (reference r) to cause the error frequency to appear where |S|≈1, i.e., r should be chosen such that $|S_r|<<|S_n|$ and $|SG_d d|<<|S_n|$. If these two presumptions are satisfied, then the measured error is an accurate representation of the position transducer measurement error. In particular, the presumption regarding the low bandwidth controller allows the error to appear with near unity gain and nearly 180° phase shift in the servo error signal. The second presumption regarding the constant rate position command guarantees that $|S_r|<<|S_n|$ and $|SG_d d|<<|S_n|$ so that the position transducer measurement error dominates the content of $e_m$.

Figure 3:
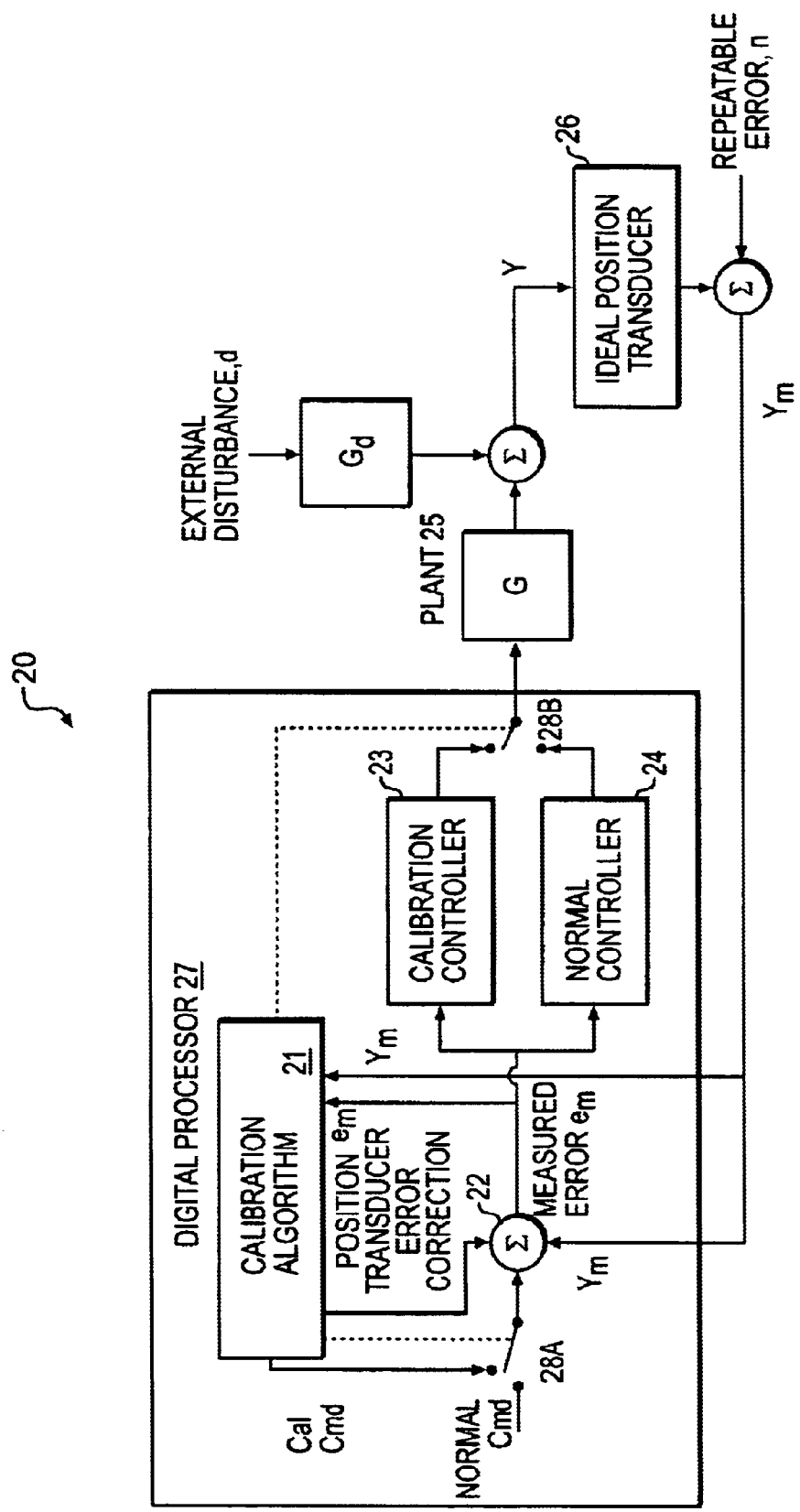
FIG. 3 is an example embodiment of a calibration operation.
Figure 4:
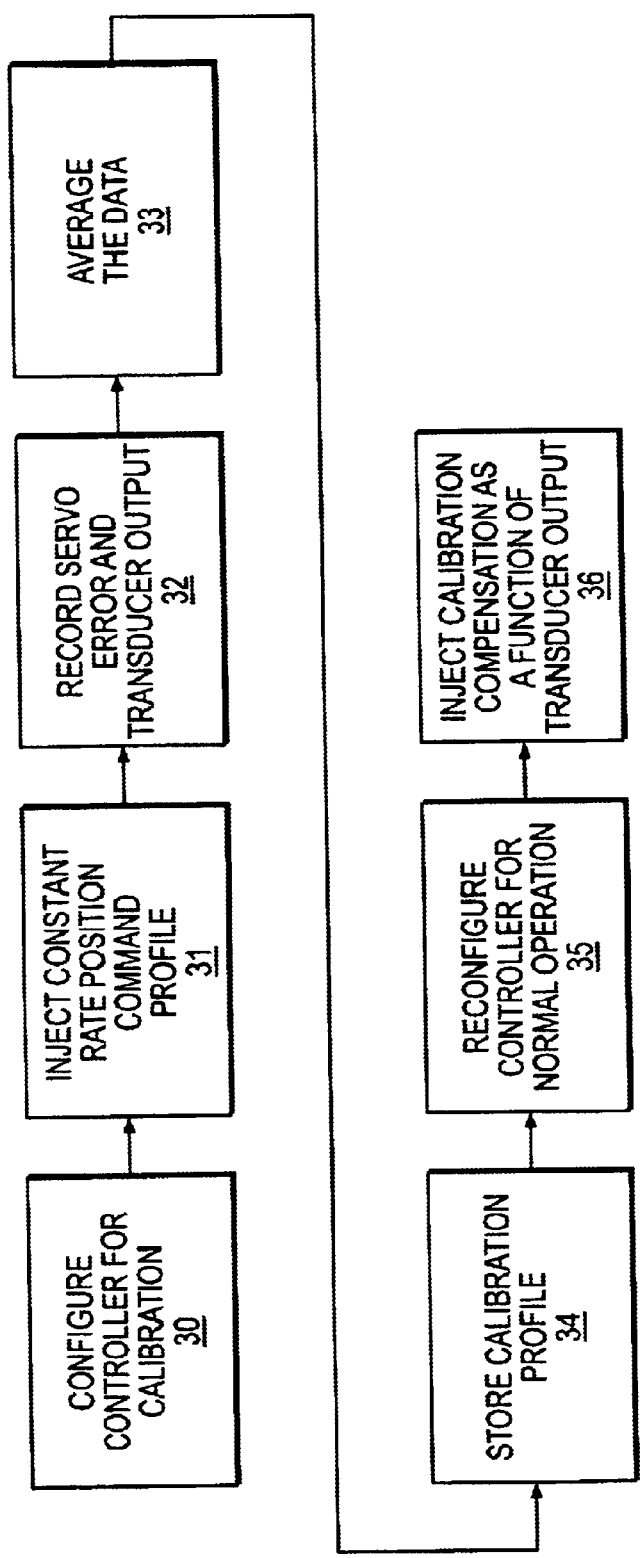
FIG. 4 is an example embodiment of a present calibration algorithm.

An example embodiment which utilizes the two presumptions is shown with respect to FIGS. 3 and 4. In FIG. 3, the position transducer 26 is a known position transducer to be calibrated by the calibration system 20 in accordance with the preferred embodiment of the present invention. Such a position transducer may be like those described in the '879 patent. In the system 20, digital processor 27 includes a calibration algorithm to perform the calibration test discussed previously. The digital processor 27 remains in-situ with the plant 25 and position transducer 26 to operate in either a normal mode or a calibration mode for the position transducer 26.

The normal mode is selected by operation of the switches 28A and 28B being placed in the normal command position. In this position, the normal command is input to the summing device 22, which sums the normal command to the measured plant output $y_m$ to yield the servo error. The servo error signal is input to the normal controller 24, which is selected by the switch 28B, the output of which is put into plant 25 and position transducer 26, respectively. The progression of the normal command, normal controller 24, plant 25, and position transducer 26 operate in accordance with known methodologies.

The present invention adds an in-situ calibration routine in which the position transducer 26 may be calibrated in the loop. In this instance, the switches 28A and 28B are switched to the calibration positions, connecting the calibration command from the calibration algorithm 21 into the summing device 22, which sums the calibration command and the measured plant output $y_m$ into the summing device 22. The result is the servo error signal, which is fed to the calibration controller 23 and to the calibration algorithm 21. The calibration controller 23 provides an output to the plant 25, and the position transducer 26, yielding the plant output signal $y_m$, which is fed back to the summing device 22.

The calibration algorithm controls the sequencing and processing when calibration is selected. When the calibration routine is selected, the normal controller 24 is replaced with the special calibration controller 23, and then the calibration algorithm performs the error calibration. The calibration algorithm stores the measured servo error and the corresponding position transducer output $y_m$. The loop is reconfigured to its normal controller when calibration is complete, by operation of the switches 28A and 28B.

The details of the calibration algorithm are shown in FIG. 4. The steps of FIG. 4 begin when the switches 28A and 28B move to the calibration position such that the control loop configuration is switched from its normal controller 24 to the special calibration controller 23 at step 30. The constant rate calibration command (CAL CMD) profile from the calibration algorithm 21 is then injected into the loop at step 31 (FIG. 4). The command profile may be triangular (back and forth motion) in nature for systems with limited travel or may be a constant rate position command for systems that have 360 degree rotational capability. As the command profile is injected into the loop by the calibration algorithm 21, at step 31, the servo error and transducer output ($y_m$) are recorded at step 32 as a function of the measured position $y_m$. Thus, while travelling at the servo controlled constant speed, the servo error and the position transducer output are simultaneously sampled and recorded. When the required number of back and forth sweeps or rotations of the position transducer 26 is achieved, the algorithm averages the stored data at step 33, thereby reducing the effect of unwanted noise in the measurements through averaging.

After the averaging is completed, the measured position transducer error is stored as a function of position transducer output in a table at step 34. Although a table is described with respect to step 34, the data may alternatively be curve fit, if appropriate. The normal controller 24 is then switched back into the loop at step 35.

Finally, at step 36, the calibration algorithm uses the position transducer output as the input to a table lookup whose output is used as the error correction value (FIG. 3), and is injected back into the loop by the calibration algorithm via the summing device 22 to compensate for the raw error detected by the calibration algorithm 21.

One can see from an analysis of FIGS. 3 and 4 that precision optical encoders can be calibrated in-situ, with good error correction, at a low cost and short test time compared to prior direct measuring devices and prior repetitive measurement in control error correctors. The present embodiment is also able to calibrate repeatable errors with good accuracy even at relatively high bandwidths.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A calibration system for a servo controlled mechanism containing a position transducer with a repeatable error and being influenced by an external disturbance, comprising:
   a closed loop having a normal operation and a calibration operation;
   an input to the closed loop, said input being a normal command during the normal operation and a calibration command during the calibration operation;
   a calibration system producing the calibration command, measuring the repeatable error during the calibration operating function, storing a characteristic of the measured repeatable error, and injecting a calibration adjustment based on the stored characteristic into the closed loop during the normal operation; and
   a controller in the closed loop having a sensitivity function that approximates a natural value at the frequency of the position transducer repeatable error and, in absolute value, is lower at the frequencies of the normal command input and of the external disturbance.

2. A system as in claim 1, wherein the servo controlled mechanism contains a position transducer.

3. A system as in claim 1, wherein the controller includes a normal controller and a calibration controller, selected based upon a mode of operation.

4. A system as in claim 1, wherein the calibration system and at least part of the controller are included in a common digital processor.

5. A system as in claim 3, wherein the calibration system, normal controller and calibration controller are included in a common digital processor.

6. A system as in claim 3, further including a switch to simultaneously select: the input as between the normal command or the calibration command, and the controller as between the normal controller or the calibration controller.

7. A system as in claim 1, wherein the sensitivity function is nearly equal to one at the lowest frequency of the position transducer repeatable error.

8. A method of calibrating, within a servo loop, a position transducer exhibiting a repeatable error, comprising the steps of:
   providing a closed loop;
   in a calibration operation:
      inputting to the closed loop a calibration reference signal;
      adjusting the calibration reference signal by a feedback signal from the servo controlled mechanism;
      measuring the position transducer repeatable error under conditions such that the adjusted signal is dominated by a measurement of the repeatable error; and
      storing the characteristics of the measured repeatable error; and
   in a normal operation:
      inputting to the closed loop a normal reference signal;
      inputting to the closed loop a position transducer calibration adjustment based on the stored characteristics;
      adjusting the normal reference signal by the fine calibration adjustment and the feedback signal; and
      providing a controlled version of the adjusted normal reference signal to the servo controlled mechanism.

9. A method as in claim 8, wherein the step of inputting to the closed loop the fine calibration adjustment during normal operation includes inputting the position transducer error measurement based on the stored characteristic.

10. A method as in claim 8, further including:
    in the calibration operation, controlling the adjusted calibration reference signal in a calibration controller within the loop prior to input into the servo controlled mechanism.

11. A method as in claim 10, wherein the calibration controller exhibits a sensitivity function that approximates a natural value at the frequency of the position transducer repeatable error and, in absolute value, is lower at the frequency of the normal reference signal than at the frequency of the position transducer repeatable error.

12. A method as in claim 11, further including:
    in the normal operation, controlling the adjusted normal reference signal in a normal controller within the loop prior to input into the servo controlled mechanism.

13. A method as in claim 8, further including:
    in the calibration operation, controlling the adjusted calibration reference signal in a calibration controller within the loop prior to input into the servo controlled mechanism;
    in the normal operation, controlling the adjusted normal reference signal in a normal controller within the loop prior to input into the servo controlled mechanism; and
    time sharing the loop between the normal operation and the calibration operation in-situ.

14. A method as in claim 13, wherein the calibration controller exhibits a sensitivity function that approximates a natural value at the frequency of the repeatable error and, in absolute value, is lower at a frequency of the normal reference signal than at a frequency of the position transducer repeatable error.

15. A method as in claim 14, wherein the sensitivity function nearly equals one at the lowest frequency of the position transducer repeatable error.

16. An in-situ calibration system for a position transducer exhibiting a repeatable error source, comprising:
    a feedback loop including a feedback signal from the position transducer;
    an input to the feedback loop, comprising a reference signal during a normal operation and a calibration signal during a calibration operation;
    a feedback node combining the input and the feedback signal into a servo error signal;
    a controller receiving the servo error signal in the loop, said controller operating during a calibration operating condition to selectively provide calibration control parameters into the loop, and during a normal operating condition, different from the calibration operating condition, to selectively provide normal control parameters into the loop; and
    a calibration utility injecting the calibration signal into the loop during the calibration operation, determining a position transducer error correction associated with the repeatable error source, and during a next normal operation, injecting a position transducer error correction signal related to said determination into the loop, wherein:

the reference signal is selected such that the position transducer error correction dominates the servo error signal during the calibration operation.

17. A system as in claim 16, wherein the calibration utility produces a sensitivity function that ensures the position transducer repeatable error dominates the servo error signal during the calibration operation.

18. A system as in claim 16, wherein the position transducer is influenced by an external disturbance input frequency and wherein the calibration utility produces a sensitivity function whose absolute value at the external disturbance input frequency and whose absolute at a frequency of the reference signal are considerably less than the absolute value at a lowest frequency on the position transducer repeatable error.

19. A system as in claim 18, wherein the reference signal ensures that the sensitivity function is essentially equal to a natural value near the frequency of the position transducer repeatable error.

20. A system as in claim 19, wherein the sensitivity function is essentially equal to one near the frequency of the position transducer repeatable error.

* * * * *